United States Patent [19]

Westberg

[11] Patent Number: 5,361,391
[45] Date of Patent: Nov. 1, 1994

[54] INTELLIGENT CACHE MEMORY AND PREFETCH METHOD BASED ON CPU DATA FETCHING CHARACTERISTICS

[75] Inventor: Thomas E. Westberg, Sudbury, Mass.

[73] Assignee: Sun Microsystems, Inc., Mountain View, Calif.

[21] Appl. No.: 901,803

[22] Filed: Jun. 22, 1992

[51] Int. Cl.$^5$ ............................................. G06F 12/08
[52] U.S. Cl. ............................... 395/425; 364/DIG. 1
[58] Field of Search ................................ 395/425, 400

[56] References Cited

U.S. PATENT DOCUMENTS

| | | | |
|---|---|---|---|
| 4,918,587 | 4/1990 | Pechter et al. | 395/400 |
| 4,980,823 | 12/1990 | Liu | 395/425 |
| 5,146,578 | 9/1992 | Zangenehpour | 395/425 |
| 5,148,538 | 9/1992 | Celtruda et al. | 395/425 |
| 5,214,766 | 5/1993 | Liu | 395/425 |

Primary Examiner—Glenn Gossage
Attorney, Agent, or Firm—Blakely Sokoloff Taylor & Zafman

[57] ABSTRACT

An intelligent cache memory system and associated method for reducing a central processing unit (CPU) idle time. The system performs prefetches based on data fetching characteristics of the CPU. The system includes cache control logic, a first and a second cache memory, each having a number of cache lines, and a first and a second cache tag array, each having cache tag entries corresponding to the cache lines. The cache tag entries comprise cache tags and valid bits. The cache tag entries of the second cache tag array further comprise interest bits. In addition to their traditional functions, the cache tags and the valid bits, in conjunction with the interest bits, are used to track the data fetching history of the CPU. For each read cycle, the cache control logic returns the data being fetched by the CPU from either the first or the second cache memory or the main memory. Additionally, the cache control logic initiates prefetch and updates the data fetching history conditionally. The data fetched from either the second cache memory or the main memory are also stored in the first cache memory, whereas the data prefetched are stored in the second cache memory. Prefetch is conditioned on the data fetching history, while data fetching history update is conditioned on where the data requested by the CPU are fetched. As a result, CPU idle time is further reduced and system performance is further improved.

12 Claims, 4 Drawing Sheets

INTELLIGENT CACHE MEMORY AND PREFETCH METHOD BASED ON CPU DATA FETCHING CHARACTERISTICS

BACKGROUND OF THE INVENTION

1. Field of the Invention

The present invention relates to the field of computer systems. More particularly, the present invention relates to cache memory on these computer systems.

2. BackGround

Typically a central processing unit (CPU) in a computer system operates at a substantially faster speed than a main memory of the computer system. Most computer systems provide cache memory which can operate at a higher speed than the main memory to buffer data and instructions between the main memory and the high speed CPUs. At any particular point in time, the cache memory stores a subset of the data and instructions stored in the main memory.

During read cycles, data and instructions are fetched from the cache memory if they are currently stored in the cache memory (read cache hits). Otherwise (read cache misses), they are retrieved from the main memory and stored in the cache memory as well as provided to the CPU. Similarly, during write cycles, data is written into the cache memory if the data is currently stored in the cache memory (write cache hits). Otherwise (write cache misses), the data is either not written into the cache memory (no write allocate) or written into the cache memory after forcing a cache line update (write allocate). Furthermore, data is written into the main memory either immediately (write through) or when a cache line is reallocated (write back).

Since the CPU goes idle in the event of a cache miss, the size and operating characteristics of the cache memory are typically optimized to provide a high cache hit rate, thereby reducing CPU idle time and improving system performance. As the speed of CPUs continues to get faster, various performance motivated approaches have also been developed to make cache hits faster or reduce cache miss penalty, thereby further reducing CPU idle time and improving system performance. Well known examples are virtual addressing to make cache hits faster, early restart and out-of-order fetching to reduce read miss penalty, use of write buffer to reduce write miss penalty, and use of two level caches to reduce read/write miss penalty. In the case of the two level cache approach, typically the first level cache is made small enough to match the clock cycle time of the CPU while the second level cache is made large enough to capture many fetches that would otherwise have to go to main memory.

However, traditional approaches to reducing CPU idle time and improving system performance seldom take the intrinsic characteristics of the applications that run on the computer systems into consideration, even though it is well known that many applications, due to their inherent nature, cause the CPU to go idle frequently and degrade system performance. For example, in many vector applications, it is quite common for a program to execute a statement like A[i]+B[i]=C[i], for i=1 to N and where N is a large number, and A, B and C are arrays. Assuming the starting addresses for arrays A and B are addr1 and addr2 respectively, the size of the array elements is 32 bytes and data is fetched in 32 byte blocks, the CPU will have to access addr1, addr2, addr1+32, addr2+32, addr1+64, addr2+64, and so forth. After at most n accesses, where n is the number of cache lines which is typically smaller than N, each subsequent access will result in a cache miss requiring access to the main memory. The data last fetched and stored in the cache lines are never used, they just keep getting overlaid.

Thus, it is desirable to have a cache memory whose design takes into consideration the inherent nature of some of the more popular applications that affect CPU idle time and system performance. In particular, it is desirable to have the cache memory's design take into consideration the inherent sequential access nature of vector applications. As will be disclosed, these objects and desired results are among the objects and desired results of the present invention.

For further description of cache memory, cache performance problems and improvement techniques, see J. L. Hennessy, and D. A. Patterson, *Computer Architecture—A Quantitative Approach*, pp. 402-461, (Morgan Kaufmann, 1990).

SUMMARY OF THE INVENTION

An intelligent cache memory and a method for conditionally prefetching data based on data accessing characteristics of a central processing unit (CPU) are hereby disclosed. The present invention has particular application to computer systems, especially those computer systems intended for vector applications.

Under the presently preferred embodiment of the present invention, the cache memory comprises control circuitry, a first and a second cache memory array, and a first and a second corresponding cache tag array. The cache tag entries in the first and second cache tag arrays, in their presently preferred form, comprise address tags and valid bits. Additionally, the cache tag entries in the second cache tag array, in their presently preferred form, further comprise interest bits.

The address tags of the first and second cache tag arrays are used for address matching to determine whether the data being accessed by the CPU are currently stored in the corresponding cache memory arrays. The valid bits of the first and second cache tag arrays are used to indicate the validity of the data stored in the corresponding cache lines of the first and second cache memory arrays. The interest bits of the second cache tag array are used to indicate whether the cache memory should prefetch the next data block. Additionally, the address tags of the second cache tag array, in conjunction with their corresponding valid and interest bits, are used for tracking the data fetching history of the application.

For each read cycle, the control circuitry fetches the data requested by the CPU from either the first or the second cache memory array or the main memory. Data fetched from either the second cache memory array or the main memory are also stored into the first cache memory array. Additionally, the control circuitry conditionally prefetches the next data block from main memory and stores that data block in the second cache memory array. Prefetching is conditioned on the data fetching history of the CPU. Furthermore, the control circuitry conditionally updates the data fetching history of the CPU. Updating the data fetching history of the CPU is conditioned on where the requested data is fetched.

For each write cycle, the control circuitry performs standard write operations. Additionally, the control circuitry conditionally resets the data fetching history of the CPU. Resetting of the data fetching history is conditioned on where the data is written.

BRIEF DESCRIPTION OF THE DRAWINGS

The objects, features, and advantages of the present invention will be apparent from the following detailed description of the preferred embodiment of the invention with references to the drawings in which.

DETAILED DESCRIPTION OF THE PREFERRED EMBODIMENT

An intelligent cache memory and a method for conditionally prefetching data based on data fetching characteristics of a central processing unit (CPU) are hereby disclosed. The present invention has particular applications to computer systems, especially those computer systems intended for vector applications. In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
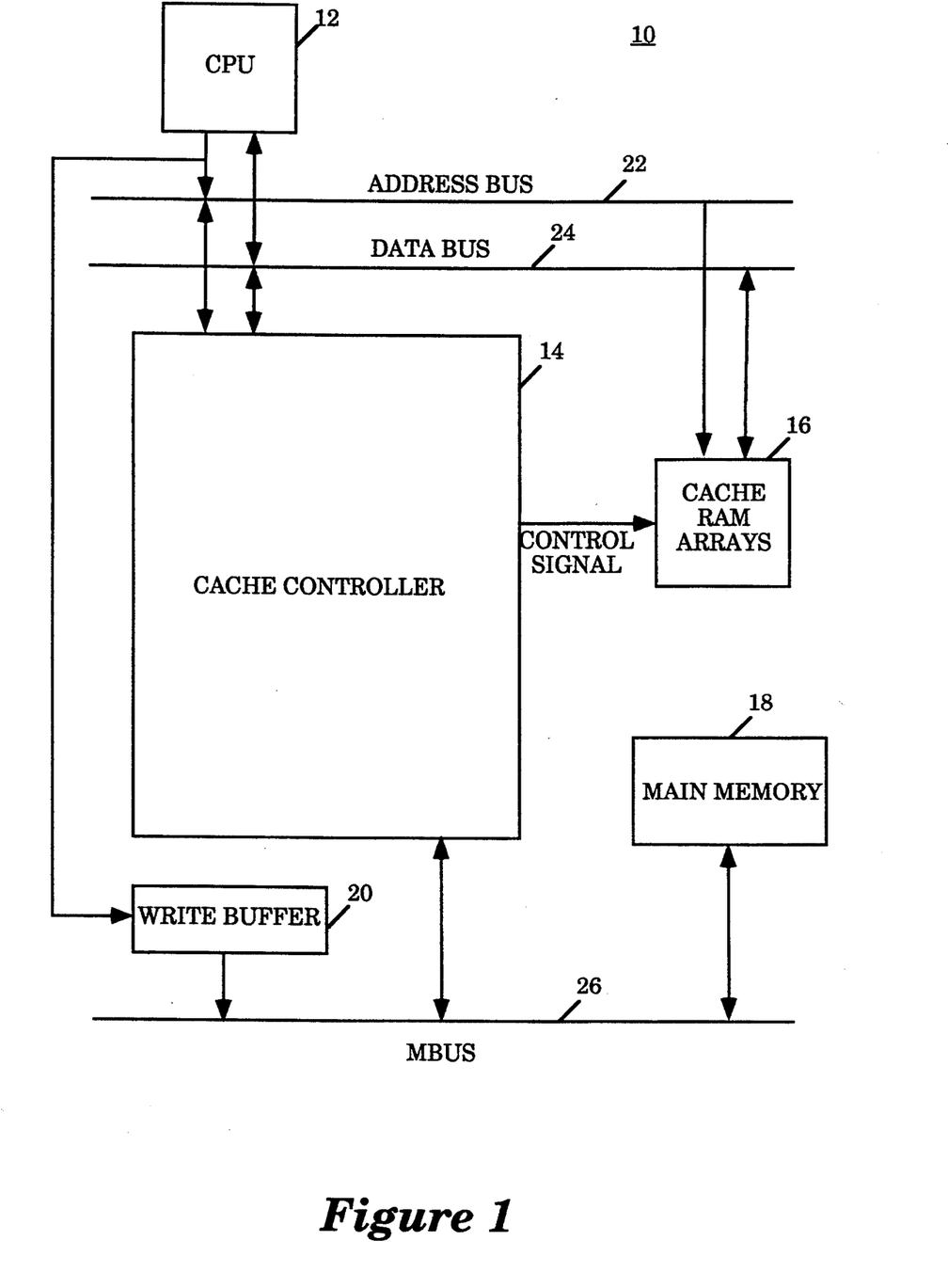
FIG. 1 illustrates a computer system which embodies the teachings of the present invention.

Referring now to FIG. 1, a block diagram illustrating a computer system which embodies the teachings of the present invention is shown. As shown in FIG. 1, the computer system 10 comprises a central processing unit (CPU) 12, a cache memory controller 14 and a hierarchy of cache random access memory (RAM) arrays (or simply cache memory arrays) 16 of the present invention, and a main memory 18. The CPU 12 is coupled to the cache memory controller 14 and the hierarchy of cache memory arrays 16 of the present invention through an address bus 22 and a data bus 24. Additionally, the CPU 12 is coupled to the main memory 18 via a write buffer 20 and a multiplexed data and address bus 26, and the cache memory controller 14 of the present invention is coupled to the main memory 18 via the multiplexed data and address bus 26.

However, it will be appreciated that the CPU 12, the cache memory controller 14 and the hierarchy of cache memory arrays 16 of the present invention, and the main memory 18 may be coupled to each other in a variety of other well known manners beside the manner used in the embodiment illustrated by FIG. 1.

The cache memory controller 14 and the hierarchy of cache memory arrays 16 of the present invention will be described in further detail later with references to FIGS. 2, 3a and 3b. The CPU 12, the main memory 18, the write buffer 20, the address bus 22, the data bus 24 and the multiplexed data and address bus 26 are intended to be representative of a broad category of well known CPUs, main memory memories, and write buffers, and communication interfaces found in most computer systems, whose basic functions and constitutions are well known and will not be described further. An example of such computer systems is the computer systems manufactured by Sun Microsystems, Inc., of Mountain View, Calif.

Figure 2:
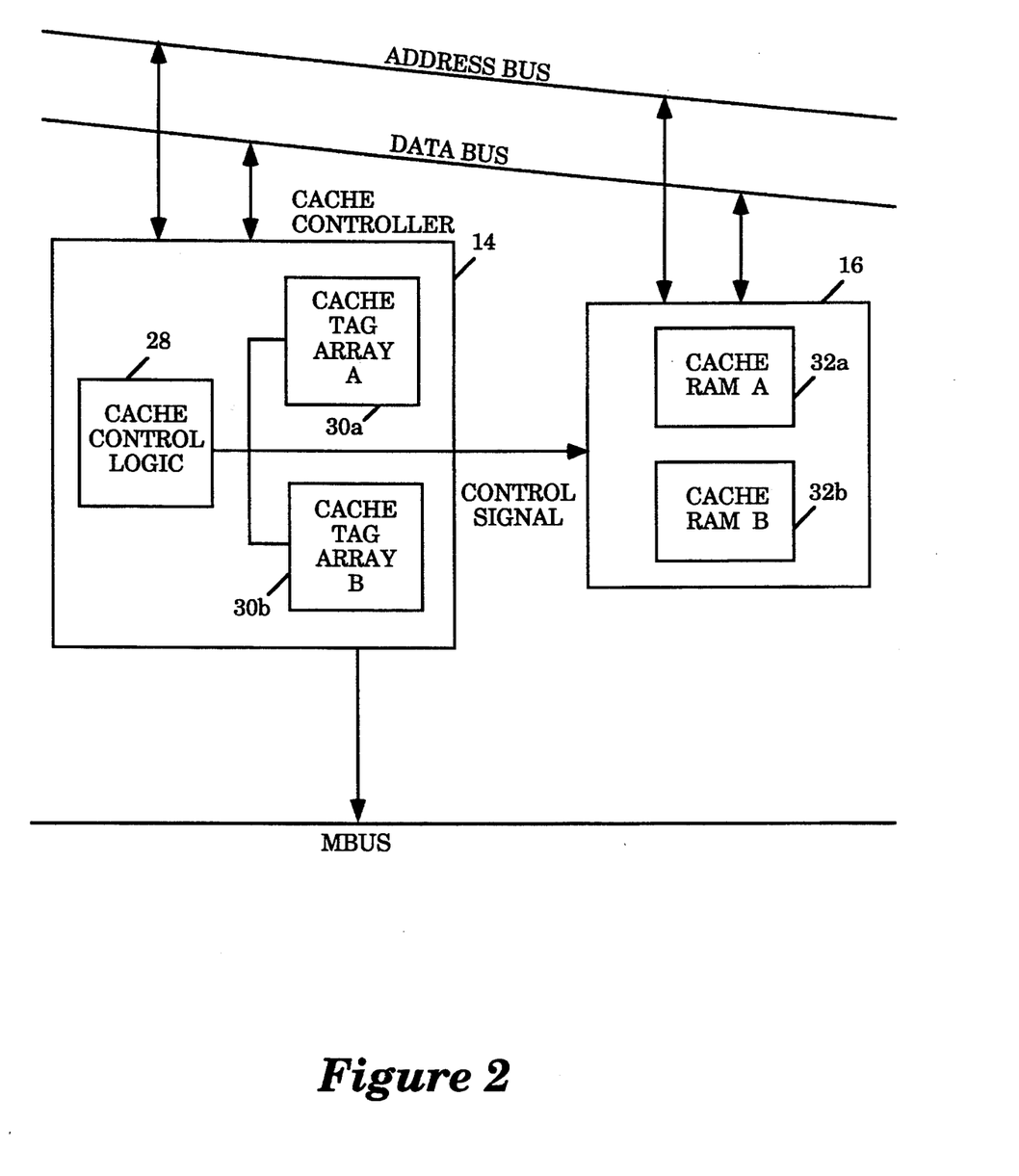
FIG. 2 illustrates an intelligent cache memory of the present invention.

Referring now to FIG. 2, a block diagram illustrating the intelligent cache memory of the present invention in its presently preferred form is shown. The hierarchy of cache memory arrays 16, in its presently preferred form, comprises a first level cache memory array A 32a, and a second level cache memory array B 32b. In their presently preferred form, the first level cache memory array A 32a comprises a plurality of 32 byte cache lines, and the second level cache memory array B 32b comprises two 32 byte cache lines.

In their presently preferred form, the main memory 18 is mapped into the cache lines of the first cache memory array A 32a in a set associative manner, and into the cache lines of the second level cache memory array B 32b in a fully associative manner. Additionally, under the presently preferred embodiment, the second cache memory array B 32b is designed to allow data to be fetched from one of its cache lines and returned to the CPU and the first cache memory array A 32a, while simultaneously allowing data fetched from the main memory to be written into the same cache line.

However, it will be appreciated that the second level cache memory array B 32b may comprise more than two cache lines. The cache lines may have line sizes other than 32 bytes. The size of the second level cache memory array B 32b cache lines may be larger than the first level cache memory array A 32a cache lines. Additionally, the main memory 18 may be mapped into the cache lines of the first and second level cache memory arrays 32a and 32b in other well known manners. Furthermore, it will be appreciated that the two levels of cache memory arrays 32a and 32b may be addressed either virtually or physically.

The cache controller 14 of the present invention, in its presently preferred form, comprises a cache control logic 28, a cache tag array A 30a, and a cache tag array B 30b. The cache control logic 28 is coupled to the cache tag arrays A and B (30a and 30b). Each cache tag array, A and B (30a and 30b) comprises a plurality of cache tags corresponding to the cache lines of the cache memory array A or B, (32a or 32b). Each cache tag (not shown) in cache tag arrays A and B (30a and 30b) comprises an address tag (not shown) and a valid bit (not shown). Additionally, in its presently preferred form, each cache tag in cache tag array B 30b further comprises an interest bit.

The cache control logic 28 comprises circuitry for controlling the operation of the cache memory controller 14. The cache control logic 28 uses the address tags in the cache tag entries of cache tag arrays A and B (30a and 30b), for address matching to determine whether data being fetched by the CPU are currently stored in the corresponding cache lines of the cache memory arrays A and B (32a or 32b). The cache control logic 28 uses the valid bits in the cache tag entries of cache tag array A and B (32a and 30b), to determine whether the data currently stored in the corresponding cache lines of the cache memory arrays A and B (32a and 32b), are valid.

Additionally, in its presently preferred form, the cache control logic 28 uses the interest bits of cache tag entry of cache tag array B 30b to indicate whether data should be prefetched. Under the presently preferred embodiment, the cache control logic 28 uses the address tags, the valid bits, and the interest bits of cache tag entries of cache tag array B 30b for tracking data fetching history of the CPU. More specifically, under the preferred embodiment, the cache control logic 28 uses the address tags, the valid bits, and the interest bits in cache tag entries of cache tag array B 30b to track sequential accesses by the CPU and initiate prefetching after the CPU has made two sequential accesses. How the cache control logic 28 uses the address tags, the valid bits and the interest bits to track data fetching history of the CPU, in particular, sequential accesses by the CPU, will be described in further detail below with references to FIG. 3a.

However, it will be appreciated that by making minor modifications to the present invention, the cache control circuitry 28 may use the cache tags, the valid bits, and the interest bits to track a variety of data fetching characteristics of the CPU. Furthermore, the cache control circuitry 28 may track data fetching characteristics of the CPU using different but essentially equivalent approaches.

Additionally, while the present invention has been described with the first and second level cache sharing the same cache control logic. It will be appreciated from the descriptions to follow that the first and second level caches operate relatively independent of each other, and the present invention may be practiced with the first and second level cache having their own control logic.

Furthermore, while the present invention has been described with the first and second level cache control logic, tag array and RAMS located together, it will be appreciated that the present invention may be practiced with these elements located separate from each other, in particular, with the second level cache control logic, tag array and RAM located with the main memory.

Figure 3A:
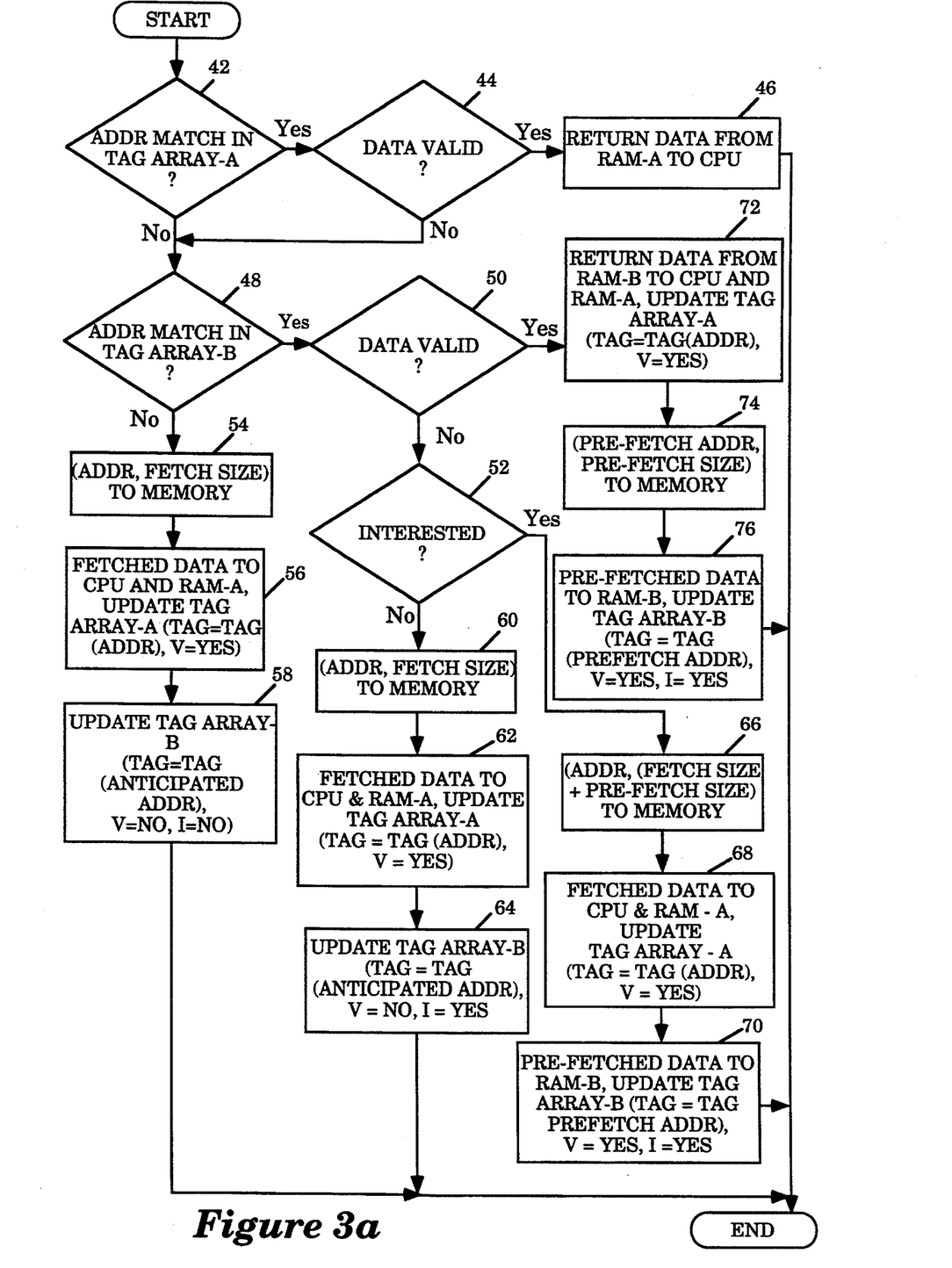
FIGS. 3a–3b illustrate a method of operating the intelligent cache memory of the present invention.
Figure 3B:
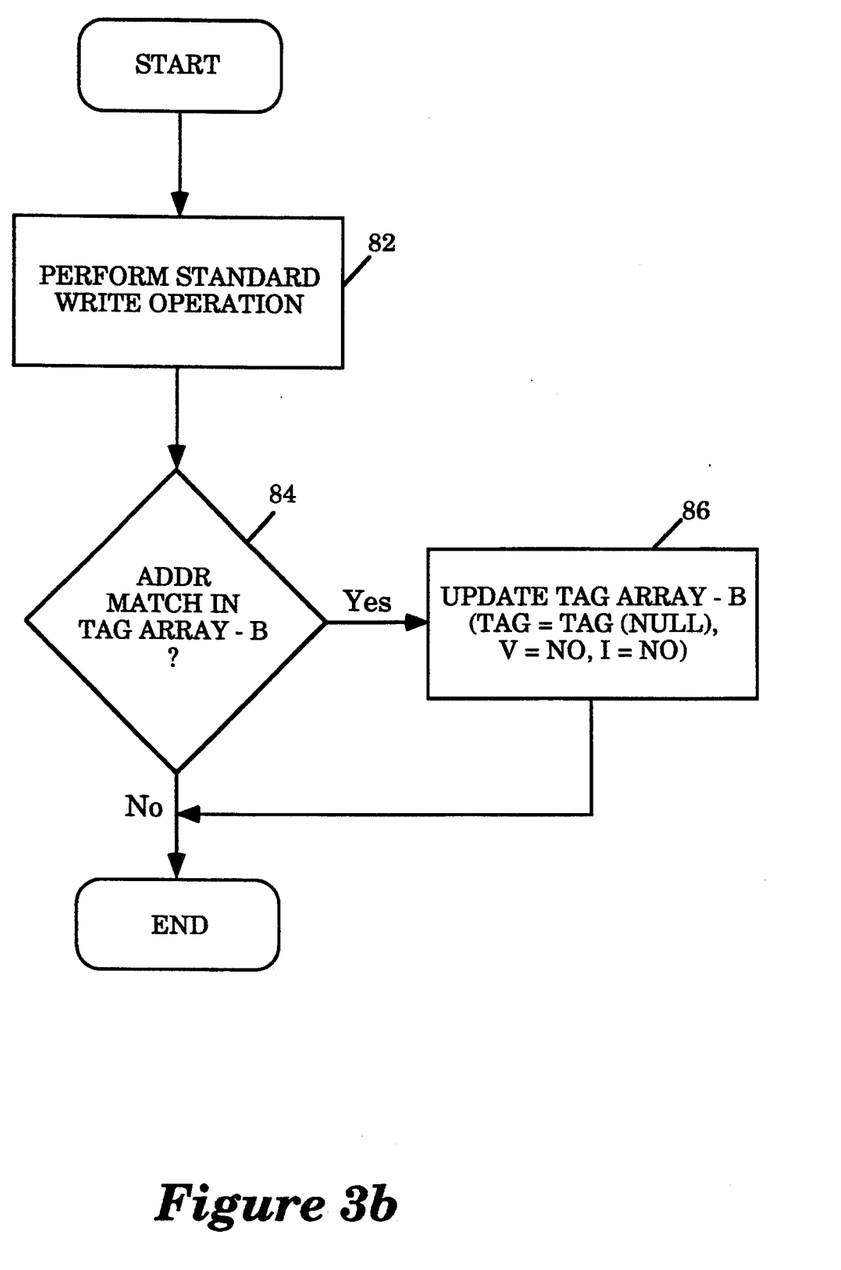

Referring now to FIGS. 3a and 3b, two block diagrams illustrating the control flow of the cache controller of the present invention are shown. Referring first to FIG. 3a, upon receipt of an address from a CPU during a read cycle, the cache control logic first determines if the address of the data being fetched matches any of the addresses of the data stored in the first level cache memory array using the corresponding cache tag entries in cache tag array A, block 42. If the address of the data being fetched matches one of the addresses of the data stored in the first level cache memory array, the cache control logic further determines if the data with the matching address are valid using the valid bit of the matching cache tag entry, block 44.

If the address of data being fetched matches one of the addresses of the data stored in the first level cache memory and the data stored in the first level cache memory is valid, the cache control logic causes the data to be fetched from the first level cache memory array and returned to the CPU, block 46.

Continuing to refer to FIG. 3a, if the address of the data being fetched does not match any address of the data stored in the first level cache memory or the data stored in the first level cache memory is invalid, the cache control logic then determines if the address of the data being fetched matches any of the addresses of the data stored in the second level cache memory using the corresponding cache tag entries in cache array B, block 48. Similarly, if the address of the data being fetched matches one of the addresses of the data stored in the second level cache memory, the cache control logic further determines whether the data stored in the second level cache memory is valid using the valid bit of the matching cache tag entry, block 50. Additionally, if the address of the data being fetched matches one of the addresses of the data stored in the second level cache memory array, but the address matching data is invalid, the cache control logic further determines whether the pre-fetch threshold has been reached using the interest bit of the matching cache tag entry, block 52. As will be obvious from the description to follow, the pre-fetch threshold is reached when the interest bit of the matching cache tag entry is set to interested.

Still referring to FIG. 3a, if the address of the data being fetched does not match any of the addresses of the data stored in the second level cache memory array, the cache control logic causes the address and a standard fetch size to be sent to the main memory, block 54. In its presently preferred form, the standard fetch size is 32 bytes. Additionally the cache control logic causes the data fetched from main memory to be returned to both the CPU and the first level cache memory, and then updates the address tag and sets the valid bit to valid in the corresponding cache tag entry in cache tag array A, block 56. Furthermore, the cache control logic updates the address tag in a predetermined manner, sets the valid bit to invalid, and sets the interest bit to uninterested in the corresponding cache tag entry in cache tag array B, block 58.

In the presently preferred embodiment, a cache tag entry in cache tag array B with the valid bit set to invalid and the interest bit set to uninterested is selected over a cache tag entry in cache tag array B with the valid bit set to invalid and the interest bit set to interested. However, a cache tag entry in cache tag array B with the valid bit set to invalid and the interest bit set to interested is selected over a cache tag entry in cache tag array B with the valid bit set to valid and the interest bit set to interested. If the settings for the valid and interest bits for all cache tag entries in cache tag array B are the same, a cache tag entry is selected arbitrarily. Additionally, under the presently preferred embodiment, the address tag is updated to the address tag of address+32.

Still referring to FIG. 3a, if the address of the data being fetched is stored in the second level cache memory, but the data stored in the second level cache memory is invalid, and the prefetch threshold has not been reached, the cache control logic causes the address and standard fetch size (32 bytes in the presently preferred embodiment) to be sent to the main memory, block 60. Similarly, the cache control logic causes the data fetched from main memory to be returned to both the CPU and the first level cache memory, and then updates the address tag and sets the valid bit to valid in the corresponding cache tag entry in cache tag array A, block 62. Furthermore, the cache control logic updates the address tag in a predetermined manner (address tag of address+32 in the preferred embodiment), sets the valid bit to invalid, and sets the interest bit to interested in the corresponding cache tag entry in cache tag array B, block 64. The valid bit of the matching cache tag entry remains set to invalid.

Still referring to FIG. 3a, if the address of the data being fetched matches one of the addresses of data stored in the second level cache memory, but the data stored in the second level cache memory is invalid, and the prefetch threshold has been reached, the cache control logic causes the address and the sum of the standard fetch size (32 bytes in the presently preferred embodiment) and the predetermined prefetch size to be sent to the main memory, block 66. In the presently preferred embodiment, the predetermined prefetch size is also 32 bytes. Likewise, the cache control logic causes the data fetched from main memory to be returned to the CPU and the first level cache memory, and then updates the address tag and sets the valid bit to valid in the corresponding cache tag entry in cache tag array A, block 68. Furthermore, the cache control logic causes the data prefetched from memory, i.e. the extra data bytes returned (the second 32 bytes under the presently preferred embodiment), to be returned to the second level cache memory array, and then updates the address tag in a predetermined manner described above (address tag of address+32 under the presently preferred embodiment) and sets to valid bit to valid. The interest bit of the matching cache tag entry remains set to interested.

Still referring to FIG. 3a, if the address of the data being fetched matches one of the addresses of the data stored in the second level cache memory array, and the data stored in the second level cache is valid, the cache control logic causes the data to be fetched from the second level memory array and returned to both the first level memory array and the CPU, and then updates the address tag and sets the valid bit to valid in the corresponding cache tag entry in cache tag array A, block 72. Additionally, since the pre-fetch threshold is always reached when the data being fetched are validly stored in the second level of cache memory array, the cache control logic causes the prefetch address, which is generated in the same manner as described above (address+32 under the presently preferred embodiment), and the standard prefetch size (32 bytes under the presently preferred embodiment), to be sent to the main memory, block 74. Similarly, the cache control logic causes the data prefetched from the main memory, i.e. all data bytes returned (all 32 bytes under the presently preferred embodiment), to be returned to the second level cache memory array, and then updates the address tag of the matching cache tag entry to be updated in the same predetermined manner as described above (address tag of address+32 under the presently preferred embodiment. The valid bit and interest bit remain set to valid and interested respectively.

Referring now to FIG. 3b, upon receipt of an address from a CPU during a write cycle, the cache control logic causes standard write operations to be performed on the first and second level cache memories, block 82. The standard write operations may be write through or write back, and with or without allocate for write misses. Additionally, if the address is currently cached in the second level of cache memory, the cache control logic updates the address tag in a predetermined manner (address tag of address+32 in the preferred embodiment), sets the valid bit to invalid, and sets the interest bit to uninterested in the corresponding cache tag entry in cache tag array B, block 86. Under the presently preferred embodiment, the address tag is set to null.

While the present invention has been described in terms of a presently preferred embodiment, those skilled in the art will recognize that the invention is not limited to the embodiment described. The method and apparatus of the present invention can be practiced with modification and alteration within the spirit and scope of the appended claims. The description is thus to be regarded as illustrative instead of restrictive on the present invention.

What is claimed is:

1. In a computer system comprising a central processing unit (CPU) coupled to a main memory, a method for reducing CPU idle time and improving system performance based on data fetching characteristics of said CPU, said method comprising the steps of:

a) detecting read cycles provided by said CPU to access data stored in said main memory, said read cycles include source addresses indicating memory locations of data to be fetched for said read cycles;

b) fetching data for each of the detected read cycles from a selected one of a first level cache memory, a second level cache memory and said main memory, as each of the read cycles is detected: wherein said first level cache memory comprises a plurality of cache lines having corresponding cache tags and valid bits, said second level cache memory comprises a plurality of cache lines having corresponding cache tags, valid bits and interest bits;

said source addresses are cached in said first level cache memory if said source addresses match said cache tags of said cache lines of said first level cache memory and said valid bits of said cache lines of said first level cache memory are set to valid, said source addresses are cached in said second level cache memory if said source addresses match said cache tags of said cache lines of said second level cache memory and said valid bits of said matching cache lines of said second level cache memory are set to valid;

said data to be fetched for said detected read cycles are fetched from said first level cache memory if said source addresses are cached in said first level cache memory at the time said read are detected said data to be fetched for said detected read cycles are fetched from said second level cache memory if said source addresses of said detected read cycles are not cached in said first level cache memory but are cached in said second level cache memory at the time said read cycles are detected, said data to be fetched for said detected read cycles are fetched from said main memory if said source addresses of said detected read cycles are not cached in said first level cache memory or said second level cache memory at the time said read cycles are detected;

the fetched data for said detected read cycles being stored into said first level cache memory if said fetched data for said detected read cycles are fetched from either said second level cache memory or said main memory:

c) prefetching data anticipated to be fetched by said CPU subsequent to each of said detected read cycles from said main memory if said data to be fetched for said detected read cycles are fetched from either said second level cache memory or said main memory, and a predetermined prefetch threshold is met at the time;

said predetermined threshold being met if said source addresses match said cache tags of said cache lines of said second level cache memory and said interest bits of said matching cache lines of said second level cache memory are set to interested;

the prefetched data for said detected read cycles being stored in said second level cache memory as the data is prefetched;

d) updating said cache tags, valid bits and interest bits of said matching cache lines of said second level cache memory as the data to be fetched for each of said detected read cycles is fetched if said data to be fetched for said detected read cycles are fetched from either said second level cache memory or said main memory;

e) returning the fetched data for each of said detected read cycles to said CPU as the data is fetched:

f) detecting write cycles provided by said CPU to store data in said main memory;

g) performing standard write operations for data to be written for each of said detected write cycles as said write cycles are detected; and h) resetting said cache tags valid bits. and interest bits of said matching cache lines of said second level cache memory conditionally as said standard write operations are performed for each of said detected write cycles the resettings being conditioned on whether the data is to be written in said first level cache memory, said second level cache memory or said main memory.

2. The method as set forth in claim 1, wherein, said write cycles provided by said CPU in said step f) include destination addresses corresponding to data to be written;

the resetting in said step h) is performed for said detected write cycles if said data to be written for said detected write cycles are to be written to memory locations anticipated to be read by said CPU, said data to be written for said detected write cycles are to be written into memory locations anticipated to be read by said CPU if said destination addresses match said cache tags of said cache lines of said second level cache memory;

the resetting in said step h) comprises setting said cache tags, valid bits, and interest bits of said matching cache lines of said second level cache memory to null, not valid and not interested.

3. The method as set forth in claim 1, wherein, said step b) comprises sending to said main memory said source addresses and fetching data sizes if the fetchings in said step b) are performed on said main memory;

if the fetching in said step b) is performed on said main memory, the prefetching in said step c) is performed in parallel with the storing and returning of fetched data in steps b) and e), the prefetching in step c) further comprises adding prefetching data sizes to fetching data sizes;

if the fetching in said step b) is performed on said second level cache memory, the prefetching in said step c) is performed in parallel with the fetching, storing, and returning in steps b) and e), the prefetching in step c) further comprises sending to said main memory prefetch addresses and prefetch data sizes said prefetch addresses are determined from said source addresses.

4. The method as set forth in claim 3, wherein, said step d) comprises the steps of:

d.1) setting cache tags, valid bits and interest bits of selected cache lines of said second level cache memory to anticipated addresses, not valid and not interested, respectively, if said source addresses do not match said cache tags of said cache lines of said second level cache memory, said anticipated addresses are determined from said source addresses;

d.2) setting cache tags and interest bits of said matching cache lines of said second level cache memory to said anticipated addresses and interested, respectively, if said source addresses match said cache tags of said cache lines of said second level cache memory, said valid and interest bits of said matching cache lines are set to not valid and not interested, respectively;

d.3) setting cache tags and valid bits of said matching cache lines of said second level cache memory to said prefetch addresses and valid, respectively, if said source addresses match said cache tags of said cache lines of said second level cache memory, said valid and interest bits of said matching cache lines are set to not valid and interested, respectively; and d.4) setting cache tags of said matching cache lines of said second level cache memory to said prefetch addresses if said source addresses match said cache tags of said cache lines of said second level cache memory, and valid bits of said matching cache lines are set to valid.

5. The method as set forth in claim 4, wherein, the selected cache lines of said second level cache memory are selected in said step d.1) as follows:

a cache line having its valid and interest bits set to not valid and not interested is selected over a cache line having its valid and interest bits set to not valid and interested;

a cache line having its valid and interest bits set to not valid and interested is selected over a cache line having its valid and interest bits set to valid and interested; and a cache line is selected randomly if said valid and interest bits of said cache lines of said second level cache memory are all set to the same settings.

6. The method as set forth in claim 5, wherein, said first level cache memory comprises a plurality of 32 byte cache lines;

said second level cache memory comprises at least one cache line, said at least one cache line having a cache line size which is a multiple of 32 bytes said main memory is mapped to said second level cache memory in a fully associative manner;

said fetching data sizes equal said prefetching data sizes and equal at least one multiple of 32 bytes; and said anticipated addresses and said prefetch addresses are determined by adding at least one multiple of 32 bytes to said source addresses.

7. In a computer system comprising a central processing unit (CPU) coupled to a main memory, an intelligent cache memory for reducing CPU idle time and improving system performance based on data fetching characteristics of said CPU said intelligent cache memory comprising:

a) a first level cache memory coupled to said CPU and said main memory for caching a first subset of data stored in said main memory; said first level cache memory comprising a plurality of cache lines having corresponding cache tags and valid bits;

b) a second level cache memory coupled to said CPU, said main memory and said first level cache memory for caching a second subset of data stored in said main memory, said second level cache memory comprising a plurality of cache lines having corresponding cache tags, valid bits and interest bits;

c) a cache memory controller coupled to said CPU, said main memory, said first level cache memory and said second level cache memory;

said cache memory controller including cache control logic for tracking said cache tags, valid bits, and interest bits of said matching cache lines of said second level cache memory; said cache memory controller for detecting read cycles provided by said CPU to access data stored in said main memory said read cycles provided by said CPU comprising source addresses indicating memory locations of data to be fetched for said read cycles, said source addresses are cached in said first level cache memory if said source addresses match said cache tags of said cache lines of said first level cache memory and said valid bits of said cache lines of said first level cache memory are set to valid, said source addresses being cached in said second level cache memory if said source addresses match said cache tags of said cache lines of said second level cache memory and said valid bits of said matching cache lines of said second level cache memory are set to valid;

fetching data for each of the detected read cycles from a selected one of said first level cache memory, said second level cache memory and said main memory, as each of said read cycles is detected, said cache memory controller fetching said data to be fetched for said detected read cycles from said first level cache memory if said source addresses are cached in said first level cache memory at the time said read cycles are detected, said cache memory controller fetching said data to be fetched for said detected read cycles from said second level cache memory if said source addresses of said detected read cycles are not cached in said first level cache memory but cached in said second level cache memory at the time said read cycles are detected, said cache memory controller fetching said data to be fetched for said detected read cycle from said main memory if said source addresses of said detected read cycles are not cached in said first level cache memory or said second level cache memory at the time said read cycles are detected;

prefetching data anticipated to be fetched by said CPU subsequent to each of said detected read cycles from said main memory if said cache memory controller fetches said data to be fetched for said detected read cycles from a selected one of said second level cache memory and said main memory, and a predetermined prefetch threshold is met at the time, said predetermined prefetch threshold being met if said source addresses match said cache tags of said cache lines of said second level cache memory and said interest bits of the matching cache lines of said second level cache memory are set to interested;

storing fetched data for said detected read cycles into said first level cache memory if said fetched data for said detected read cycles are fetched from a selected one of said second level cache memory and said main memory;

storing the prefetched data for said detected read cycles into said second level cache memory as the data is prefetched;

updating said cache tags, valid bits, and interest bits of the matching cache lines of said second level cache memory if said cache memory controller fetches said data to be fetched for said detected read cycles from said selected one of said second level cache memory and said main memory, and returning the fetched data for each of said detected read cycles to said CPU as the data is fetched;

said cache memory controller also for detecting write cycles provided by said CPU to store data in said main memory, causing standard write operations to be performed for data to be written for each of said detected write cycles as said write cycles are detected, and resetting by said cache tags, valid bits, and interest bits of the matching cache lines of said second level cache memory conditionally as said standard write operations are performed for each of said detected write cycles, the resetting being conditioned on whether the data is to be written in said first level cache memory, said second level cache memory or said main memory.

8. The intelligent cache memory as set forth in claim 7, wherein, said write cycles provided by said CPU comprise destination addresses corresponding to data to be written;

said cache memory controller resets said, cache tags, valid, bits, and interest bits of said matching cache lines of said second level cache memory if said data to be written for said detected write cycles are to be written to memory locations anticipated to be read by said CPU by said cache memory controller;

said cache memory controller anticipates said memory locations to be read by said CPU if said destination addresses match said cache tags of said cache lines of said second level cache memory;

said cache memory controller resets said data fetching history of said CPU by setting said cache tags, valid bits, and interest bits of said matching cache lines of said second level cache memory to null, not valid and not interested.

9. The intelligent cache memory as set forth in claim 7, wherein, said cache memory controller sends said main memory said source addresses and fetching data sizes if said cache memory controller fetches said data to be fetched for said detected read cycles from said main memory;

said cache memory controller prefetches said data anticipated to be fetched by said CPU at subsequent cycles to said detected read cycles in parallel with the storing and returning of fetched data, if said cache memory controller fetches said data to be fetched for said detected read cycles from said main memory, said cache memory controller adding prefetching data sizes to said fetching data sizes when said cache memory controller sends said fetching data sizes to said main memory;

said cache memory controller prefetches said data anticipated to be fetched by said CPU at subsequent cycles to said detected read cycles in parallel with fetching said data to be fetched for said detected read cycles from a selected one of said first level cache memory second level cache memory and said main memory, conditionally storing said fetched data into said first level cache memory, and returning said fetched data to said CPU, if said cache memory controller fetches said data to be fetched for said detected read cycles from said second level cache memory, said cache memory controller sending to said main memory prefetch addresses and prefetch data sizes while fetching said data to be fetched for said detected read cycles from said second level cache memory, said cache memory controller determining said prefetch addresses from said source addresses.

10. The intelligent cache memory as set forth in claim 9, wherein, said cache memory controller updates said cache tags, valid bits, and interest bits of said matching cache lines of said second level cache memory by, setting cache tags, valid bits and interest bits of selected cache lines of said second level cache memory to anticipated addresses, not valid and not interested respectively, if said source addresses match said cache tags of said cache lines of said second level cache memory, said anticipated addresses being determined from said source addresses, setting cache tags and interest bits of said matching cache lines of said second level cache memory to said anticipated addresses and interested respectively, if said source addresses match said cache tags of said cache lines of said second level cache memory, said valid and interest bits of said matching cache lines are set to not valid and not interested respectively, setting cache tags and valid bits of said matching cache lines of said second level cache memory to said prefetch addresses and valid respectively if said source addresses match said cache tags of said cache lines of said second level cache memory, said valid and interest bits of said matching cache lines are set to not valid and interested respectively, and setting cache tags of said matching cache lines of said second level cache memory to said prefetch addresses if said source addresses match said cache tags of said cache lines of said second level cache memory, and valid bits of said matching cache lines are set to valid.

11. The intelligent cache memory as set forth in claim 10, wherein, said cache memory controller selects said cache lines of said second level cache memory as follows:

a cache line having its valid and interest bits set to not valid and not interested is selected over a cache line having its valid and interest bits set to not valid and interested;

a cache line having its valid and interest bits set to not valid and interested is selected over a cache line having its valid and interest bits set to valid and interested; and a cache line is selected randomly if said valid and interest bits of said cache lines of said second level cache memory are all set to the same settings.

12. The intelligent cache memory as set forth in claim 11, wherein, said first level cache memory comprises a plurality of 32 byte cache lines;

said second level cache memory comprises at least one cache line, at least one cache line having a cache line size which is a multiple of 32 bytes;

said main memory is mapped to said second level cache memory in a fully associative manner;

said cache memory controller sets said fetching data sizes and said prefetching data sizes to at least one multiple of 32 bytes; and said cache memory controller determines said anticipated addresses and said prefetch addresses by adding at least one multiple of 32 bytes to said source addresses.

* * * * *

UNITED STATES PATENT AND TRADEMARK OFFICE
CERTIFICATE OF CORRECTION

PATENT NO.   : 5,361,391
DATED        : November 1, 1994
INVENTOR(S)  : Westberg It is certified that error appears in the above-identified patent and that said Letters Patent is hereby corrected as shown below:

In column 8, claim 1 at line 30, please delete " read " and insert -- read cycles --.

In column 11, claim 7 at line 33, please delete " cycle " and insert -- cycles --.

Signed and Sealed this

Twenty-ninth Day of September, 1998

Attest:

BRUCE LEHMAN

*Attesting Officer*    *Commissioner of Patents and Trademarks*